March 14, 1939.  C. H. MANEVAL  2,150,558
HAND COASTER SLED
Filed Feb. 5, 1937
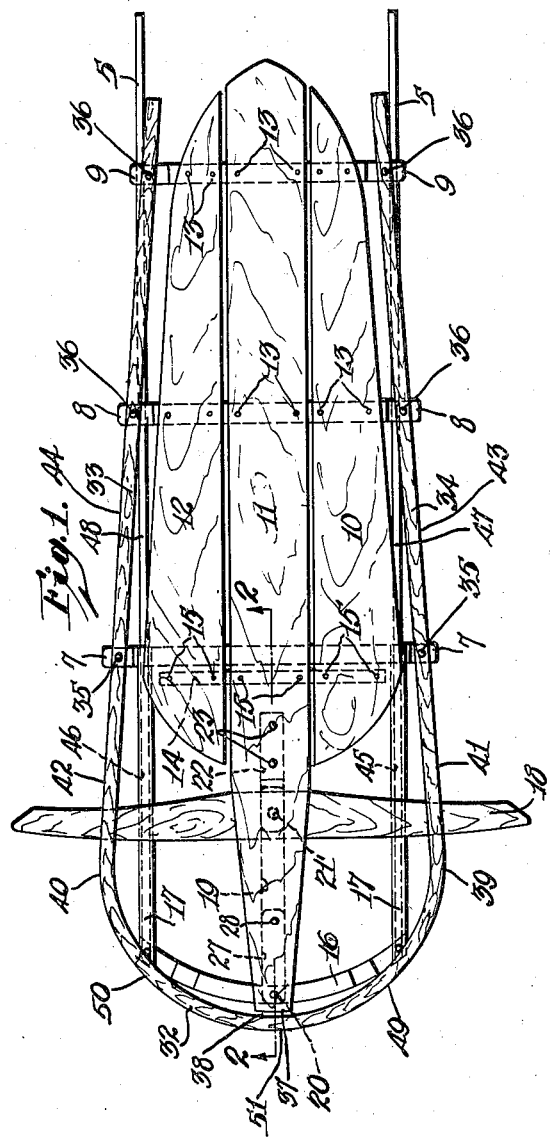
Witnesses:
Elmer W. Hacker
Walter Chism
Inventor
Charles Herbert Maneval
by C. Steel Jackson and Son
Attorneys.

Patented Mar. 14, 1939

2,150,558

UNITED STATES PATENT OFFICE 2,150,558

HAND COASTER SLED

Charles Herbert Maneval, Duncannon, Pa., assignor to Standard Novelty Works, Duncannon, Pa., a corporation of Pennsylvania Application February 5, 1937, Serial No. 124,192

9 Claims. (Cl. 280—22)

My invention relates to hand sleds.

A purpose of my invention is to stabilize the front of the top of the sled against the steering mechanism while permitting free movement for steering purposes.

A further purpose is to free the front portion of the top of the sled from connection with the front bench when using an integral front and side fender of resilient material so as to gain the full advantage of the spring of the fender in steering.

A further purpose is to allow the front fender and a side fender integral with it to move bodily laterally along with the runners and connecting knees so as to consolidate all of these to form interrelated steering mechanism, using to the best advantage the combined lateral deflection of the fender and the runners in controlling and resetting the steering mechanism.

A further purpose is to support the front of the top of the sled from the runners while freeing the top of the sled from connection with the front bench and from lateral movement with the runners, in order to permit an integral front and side fender to be used to reinforce the steering mechanism.

Further purposes will appear in the specification and in the claims.

The invention has been illustrated in connection with a streamlined hand sled having steering mechanism and runners controlled by the steering mechanism.

Figure 1 is a top plan view of a sled well illustrating the principles of my invention.

Figure 2 is a section of Figure 1 taken upon line 2—2, and looking in the direction of the arrows.

In the specification similar numerals indicate like parts.

High premium has been placed upon the manufacture of as much as possible of the body of a hand sled from wood on account of the resilience of the wood, its low weight as compared with steel which has been prohibitive for this reason, because of its lower price and for the further reason that in cold weather, when the sled is in use, the steel feels cold. For these reasons the manufacturers of sleds have avoided the use of steel in body parts as much as possible and have attempted to retain the wood construction.

The manufacture of the fender of the sleds has been unsatisfactory as generally constructed because where a front fender has been used it has been attached to the ends of the side fenders without having been "consolidated" with them, with the result that it forms a front merely for the sled without being incorporated fully into combination with the side fenders. In this and in a companion application applicant has shown a solution of this problem by forming the front and side fenders as one integral strip supporting each by the other not only against longitudinal movement but supporting against lateral movements in a way which is not present where the front fender is made of a separate piece or of separate pieces from the side fenders.

In connection with the integral fender the present invention goes a step further in largely freeing the integral front and side fenders and bench with the runners to which the bench is attached from the top of the sled.

The rear end of the steering lever is pivotally supported by the top and the front of the steering mechanism affords support to the top board without interfering with independent lateral movement of the front of the runners with respect to the top board.

The present invention is intended to divorce the front fender from the front of the top of the sled and to incorporate it with and make it sensitive to changes in the steering mechanism and reactive to the steering operations.

In the illustration the construction has been shown in a sled in which steering is secured by lateral flexure of the runners.

The sled is provided with the usual runners 5, knees 6, benches 7, 8 and 9 and top boards 10, 11 and 12. The knee connection of the runners 5 with the bench 7 preferably permit pivotal movement of the knee to facilitate lateral flexure of those portions of the runners lying between knees 7 and 8. The top boards are attached as at 13 to the benches 8 and 9 but are free from the bench 7 so that bench 7 along with the runners and the side fenders can shift laterally with respect to the top boards during steering operations.

The top boards are connected adjacent the bench 7 by a cleat 14 to which they are fastened at 15 so that transversely the top boards act as a single board.

The forward ends of the runners are joined by a metal head iron 16 and the forward end of each runner is connected with the bench 7 through a separate steel side rail 17.

Steering is effected by a steering bar 18 which is rigidly fastened to a steering lever 19 pivoted at its front end by bolt 20 to the middle of the head iron 16. The rear end of the steering lever is pivoted at 21 to a bracket 22 which is secured at 23 to the middle top board. The pivot pin is here shown as passing through the steering bar 18 so that the steering bar swings directly about the steering pivot.

The steering lever 19 is made up of two straps 24 and 25 which span the steering bar 18 and are connected rigidly with it in any suitable way as by bolts 26.

The middle top board is supported from the head iron 16 without interfering with relative lateral movement between them by means of a stabilizer 27 in the form of an angular bracket which is pivoted to the middle top board at 28 and is pivoted to the head iron by bolt 29. The stabilizer has bearing at 29 against the underside of the middle top board and bears at 30 against one of the parts where the steering lever pivots to the head iron, here the upper strap 24 of the steering lever. The rear end of the stabilizer is slotted at 31 where it pivots about pin 28, the purpose of the slot being to accommodate the different lengths of the arm comprising the stabilizer from pivot to pivot with lateral movement of the head piece.

A considerable advantage is secured in the use of an integral wooden fender comprising a front fender 32 which is the middle (bent) part of a single strip whose ends form side fenders 33 and 34. The side fenders are secured to the front bench at 35 and to the other benches at 36. This construction leaves the front fender and the side fenders free for movement laterally with the front bench, i. e., free from the top boards and therefore free from pivotal support for the steering lever. At the same time cleat 14 holds the top boards together at the front and gives the top boards support as a unit upon the two benches 8 and 9, introducing slight lateral resilience from the lateral spring of the top boards in front of bench 8 and requiring of course that the fastening to benches 8 and 9 be more secure than would otherwise be required.

With the construction indicated the side fenders are in effect pivoted each for lateral swinging movement about their attachments to the second bench.

The steering lever 19 is in effect a crank arm extending forwardly from the middle of the steering bar 18, the members 18 and 19 comprising a steering unit having at 21 pivot connection through bracket 22 with the middle board 11 and at 20 having through the head iron 16 operating connections with the forward ends of the runners 17. It will be seen that angular steering movement of the steering unit deflects the runners at their forward ends laterally in the steering direction and reversely deflects the forward portion of the middle board 11.

The main advantages of the integral wooden fender lie in the highly desirable resilience afforded throughout the fender length, the interaction of the front and side fender parts, each with the other and the fender interaction with the steering mechanism.

Forming the front and side fenders from a single wooden strip which is bent at the middle to form the front fender and whose terminals form the side fender not only reduces the cost of making the front and side fenders as individual elements of the sled but also reduces the cost of assemblage of the parts.

The front fender preferably is spaced slightly in front of the end 37 of the center top board, leaving a space 38 between them to permit resilient bumper action, utilizing the spring of the wood itself. This spacing is short enough for the end 37 of the center top board to act as a stop to prevent collapse of the front fender.

The front fender and side fenders at all times have a different action due to their integrality from the action of a front fender and side fenders which are connected at some such point as 39 and 40 since lateral movement of the front fender or springing back of the middle of the front fender reacts through the front portions 41 and 42 of the side fenders in advance of bench 7 upon the portions 43 and 44 of the side fenders as indicated in much the same way that steering lateral movement of the front of the runners in the section 45, 46 of the runners, reacts upon the sections 47 and 48 of the runners. This is true if the pressure upon the sections 41 and 42 of the side fender be directly lateral, if we are dealing with the lateral component of a diagonal blow upon some such portion of the front fender as 49 or 50 or if we are considering the lateral outward movement of each of the sections 41 and 42 of the side fenders when they have been spread by a blow upon the front of the front fender as at 51.

When steering takes place even if there be no blow or pressure upon the front or side fenders these fenders have a part in determining the resultant sled reaction.

The response to lateral and to diagonal forces will be evident since freedom of the bench 7 to move laterally with respect to the top boards permits the bench 7 to move bodily to left or right with steering movement of the front runner sections to left or right. The movement of the bench 7 carries the side fenders with it against the resilient resistance of the side front fender sections 43 and 44, since the bench 7 cannot move with respect to the top boards without providing additional lateral flexure of the sections 47 and 48 of the runners. This causes additional flexure of the sections 43 and 44 of the side fenders. The construction shown adds both of these additional flexures, permitting wider steering action (against stronger resistance it is true) and providing additional spring return for the runners.

In view of my invention and disclosure variations and modifications to meet individual whim or particular need will doubtless become evident to others skilled in the art, to obtain part or all of the benefits of my invention without copying the structure shown, and I therefore, claim all such in so far as they fall within the reasonable spirit and scope of my invention.

Having thus described my invention, what I claim as new and desire to secure by Letters Patent is:

1. In a hand sled having a pair of runners, knees, benches and side fenders connected with the front bench, a head iron connecting the runners, top boards attached to rear and intermediate benches but free from attachment to the front bench, a cleat uniting the top boards adjacent the front bench, a steering lever pivotally connected at one end with the top boards and at the other end with the head iron, a steering bar therefor, the steering lever and steering bar being rigidly connected and together forming a steering unit, and a wooden front fender continuous with the side fenders at the sides, whereby the front fender and the front ends of the side fenders along with and by the front bench are shifted as compared with the top boards in the direction of shift of the runners when steering takes place.

2. In a hand sled having runners, knees, benches and a top, the top being free from attachment to the front bench, a cleat uniting the boards of the top adjacent the front bench, a head iron uniting the tops of the runners, a steering unit pivotally connected to the top at the rear of the unit and pivotally connected to the head iron at the front of the unit, a stabilizing support for the front of the top from the head iron and permitting steering movement of the head iron with respect to the top, wooden side fenders united to the benches and a front fender integral with the side fenders.

3. In a hand sled having runners, knees, benches and a top, the top being free from attachment to the front bench, a cleat uniting the boards of the top adjacent the front bench, a head iron uniting the tops of the runners, a steering unit pivotally connected to the top at the rear of the unit and pivotally connected to the head iron at the front of the unit, a stabilizing support for the front of the top from the head iron and permitting steering movement of the head iron with respect to the top, side fenders united to the benches and a wooden front fender integral with the side fenders and limited in rearward collapse by engagement with the front end of the sled top.

4. In a hand sled having runners, knees and benches, a head iron connecting the runners, side bars connecting the runners and head iron with the front bench, a wooden front fender, side fenders continuous with the front fender, a sled top terminating short of the front fender and acting as a stop to rearward movement of the front fender, steering means for shifting the head iron with respect to the top laterally thereof and a support for the front of the top from the head iron, permitting relative movement of the steering means and top.

5. In a hand sled having runners, knees, benches and a top united to the rear and intermediate benches and laterally free from union with the front bench, a head iron connecting the ends of the runners, a cleat uniting the forward parts of the top boards, a wooden front fender, side fenders continuous with the front fender and united to the benches, a forwardly and rearwardly extending steering lever pivotally supported at the rear end from the top and at the forward end in the head iron and a support for the front of the top of the sled from the head iron permitting steering movement of the head iron with respect to the top.

6. A hand sled having runners, knees, benches and a top united to the benches and free to move laterally on the front bench, side fenders united to the benches including the front bench, a head iron uniting the upper front ends of the runners, a steering unit comprising a transverse hand bar across and beneath the fenders and across and beneath the top and a forwardly extending operating bar rigidly fastened to the hand bar, a fulcrum pivot for the unit and the pivot being located in the hand bar near the middle thereof, a pivot-supporting bracket from the top presenting a pivot supporting surface beneath the unit and thereby presenting upwardly to the fenders, ties between the knees at the forward bench and the head iron at the runner-end portions thereof, pivot connection between the operating bar and head iron at the middle thereof and a loose supporting connection between top and head iron from its said pivot connection with the operating bar.

7. A hand sled having runners, a head iron between the runners, knees, front, intermediate and rear benches connected with the knees, side rails connecting the ends of the runners with the front bench toward opposite ends thereof, a longitudinally divided top connected with the rear and intermediate benches but free from connection with the front bench, a cleat connecting the parts of the top in front of the intermediate bench, a steering lever pivotally connected to the top at one end and to the head iron at the other end, a steering bar connected rigidly to the steering lever transversely thereto and crossing the rails above the rails and a resilient wooden strip forming front and side fenders, located to cross the steering bar toward opposite ends thereof above the steering bar, the front fender being integral with the side fenders, the strip being curved at the front and each side where the front and side fenders merge.

8. A hand sled having runners, a head iron connecting the fronts of the runners, knees, benches connected with the knees and runners, side rails connecting the ends of the runners with the fixed part of the sled at the front knees, a top, a steering lever pivotally connected to the top at one end and to the head iron at the other end, a steering bar connected with the steering lever transversely thereto and extending above the rails and a resilient integral strip forming wooden front and side fenders, located at the front above the steering bar, the strip being curved at the front and each side where the front and side fender portions merge.

9. In a hand sled having a pair of runners, knees, benches and side fenders connected with the front bench, a head iron connecting the runners, top boards attached to rear and intermediate benches but free from attachment to the front bench, a cleat uniting the top boards, a forwardly and rearwardly extending steering lever connected pivotally at its rear end with the top boards and at its forward end pivotally with the head iron, a steering bar rigidly connected to and transversely across the steering lever toward the rearward end thereof, one of the top boards extending forwardly beyond the others and an upward support for the forwardly extending top board at the forward end thereof from the head iron and permitting relative movement of the head iron and supported top in directions lateral of the sled.

CHARLES HERBERT MANEVAL.